United States Patent
Beard et al.

(10) Patent No.: US 8,163,081 B2
(45) Date of Patent: Apr. 24, 2012

(54) COMPOSITE MATERIALS USING NOVEL REINFORCEMENTS

(76) Inventors: Kirby Wayne Beard, Norristown, PA (US); Drew Franklin Beard, Norristown, PA (US)

(*) Notice: Subject to any disclaimer, the term of this patent is extended or adjusted under 35 U.S.C. 154(b) by 166 days.

(21) Appl. No.: 10/404,031

(22) Filed: Apr. 2, 2003

(65) Prior Publication Data
US 2003/0188667 A1    Oct. 9, 2003

(51) Int. Cl.
*C04B 14/38* (2006.01)
(52) U.S. Cl. .......................................... 106/644; 106/713
(58) Field of Classification Search .................. 106/724, 106/644, 713
See application file for complete search history.

(56) References Cited

U.S. PATENT DOCUMENTS

| | | | | |
|---|---|---|---|---|
| 2,697,677 A | * | 12/1954 | Elendorf | |
| 4,086,097 A | * | 4/1978 | Carbonnel | 501/124 |
| 4,306,911 A | * | 12/1981 | Gordon et al. | |
| 4,341,835 A | * | 7/1982 | MacDowell | 428/294.7 |
| 4,588,443 A | * | 5/1986 | Bache | 106/644 |
| 4,923,517 A | * | 5/1990 | Rerup et al. | 524/3 |
| 4,950,627 A | * | 8/1990 | Tokarz et al. | |
| 4,979,992 A | * | 12/1990 | Bache | 106/644 |
| 5,308,696 A | * | 5/1994 | Hanashita et al. | 428/357 |
| 5,685,902 A | * | 11/1997 | Tezuka et al. | 106/643 |
| 6,569,233 B2 | * | 5/2003 | Macklin et al. | 106/644 |
| 6,790,275 B2 | * | 9/2004 | Macklin et al. | 106/644 |
| 6,808,560 B2 | * | 10/2004 | Macklin et al. | 106/644 |
| 6,821,336 B1 | * | 11/2004 | Ramme et al. | 106/709 |
| 6,872,246 B2 | * | 3/2005 | Merkley et al. | 106/805 |
| 6,887,309 B2 | * | 5/2005 | Casanova et al. | 106/644 |
| 2002/0157575 A1 | * | 10/2002 | DiLullo et al. | 106/711 |
| 2004/0168615 A1 | * | 9/2004 | Luo et al. | 106/805 |
| 2005/0016423 A1 | * | 1/2005 | Merkley et al. | 106/805 |
| 2005/0235883 A1 | * | 10/2005 | Merkley et al. | 106/805 |

* cited by examiner

*Primary Examiner* — Paul Marcantoni
(74) *Attorney, Agent, or Firm* — Bay State IP, LLC; Adam J. Bruno; Janine D. Geraigery

(57) ABSTRACT

The present invention relates to materials used for building products, construction projects, structural objects, mechanical devices and other materials applications. Specifically, the invention concerns composite materials made with reinforcing elements in a binder matrix material. A method of strengthening materials is described that uses high volumes of reinforcing elements, which can be easily dispersed and uniformly distributed, consisting of large diameter fibers, miniature rods or other similar geometric shapes with a diameter or thickness between 0.05 mm and 20 mm where the reinforcements are incorporated either as short, randomly distributed elements or long, continuous aligned arrays.

14 Claims, No Drawings

COMPOSITE MATERIALS USING NOVEL REINFORCEMENTS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF INVENTION

The present invention relates to materials used for building products, construction projects, structural objects, mechanical devices and other materials applications. Specifically, the invention concerns composite materials made with reinforcing elements in a binder matrix material. Materials such as Portland cement, gypsum, epoxy and polyester thermoset resins, thermoplastics, etc. are often reinforced with fine filaments of glass, carbon, ceramic, wood pulp/cellulose and polymers or other fibers, particles or rods to provide improved strength, stiffness and toughness. Concrete (Portland cement with stone/rock aggregates and sand) uses steel or other rods or fibrous strands to provide engineering structures with high load carrying capabilities. These composite systems are produced in two basic design configurations:

1. Long or essentially continuous, aligned reinforcing elements disposed in the axes, planes or surfaces of applied force
2. Short, randomly-oriented reinforcing fibers uniformly dispersed throughout object High levels of properly placed reinforcement are required to improve matrix strength. However, the processes used to produce these composites are often quite complex and the resultant products are relatively costly. For instance, composites using long, aligned reinforcements, such as filament wound fiberglass reinforced plastics or pre-stressed steel/concrete, can achieve high reinforcement volume loading content (over 50% of composite volume) and correspondingly high strength, but the design flexibility is limited and manufacturing costs are high since these reinforcements must be individually and precisely placed into position. In the second case (composites using short, randomly dispersed reinforcements), fiber clumping, incomplete fiber/binder wet-out and poor flow or molding characteristics of the mixtures limit reinforcements to 10 to 20% maximum fiber volume for many types of common composite systems (i.e., polyester resin compounds with chopped graphite or glass fibers; fiberglass or cellulose fiber reinforced cement pastes; etc.). Sophisticated mixing and intensive pressing/molding/laminating/extrusion techniques are needed to achieve higher levels of reinforcement necessary to improve composite strength or other properties.

Often, unique and expensive processes such as filament winding; high pressure compression molding and extrusion; resin transfer, reaction and injection molding; paper-making processes; spray-up; centrifugal casting; etc. are required for various common types of composite materials. A reinforcing material that can be easily mixed or placed into the binder material and formed by simple means into both thin flat sheets and complex shapes would be highly desirable. Additionally, the reinforcements must provide the improved strength and other physical property benefits at an economical cost.

Extensive efforts have been made to accomplish these goals. To date no inventions have been identified that allow for a highly reinforced matrix material to be formed directly into a final product with acceptable costs and adequate mechanical property improvements. Reinforced polymer materials continue to be made largely by filament winding, extrusion, injection or compression molding, spray-up and other costly methods. Concrete still use pre-stressing or post-tensioning of steel wire or bars as the primary construction method. Some new products have been introduce that use recent advances in glass fiber, wood pulp and other technologies allowing the replacement of a variety of asbestos-cement materials that have been banned due to health-related problems from asbestos. Also, a few novel, commercial products that allow simple, cheap manufacture have been developed such as premixed polymer, carbon and stainless steel fiber reinforced cement blends and short fiber filled, extruded thermoplastic pellets. However, none of these products listed above provide simple manufacturing combined with adequate increased strength to allow for use in load-bearing or structural applications. The technologies suffer in one or more of the following areas, 1. Low reinforcement levels (generally, less than 10 to 20% by volume)
2. The need for expensive, complex processing equipment and manufacturing techniques (especially to achieve >50% volume reinforcement levels)
3. Minimal benefit to design strength limits (yield or deflection point) or other structural properties despite increased levels of reinforcement
4. Excessive material cost and/or poor reinforcing efficiencies (cost:benefit ratio)

Often when improvements are made in one area, however, the other areas are either ignored or suffer other additional problems.

Prior art has followed various traditional paths to improve composite properties and manufacturing ability. Thermoset resins (cross-linked monomers) and thermoplastics (heat processed polymers) have focused on the adaptation of new production methods and equipment. The reinforcements still include traditional fine filaments or bundled strands of glass, carbon, Kevlar and similar fibers. Improvements in the formulations, sizings/coatings and fiber properties have been espoused, but the actual form and geometry of the reinforcements has remained largely unchanged (multiple filament strands). Issues remain on the best way to wet-out or coat the fiber surfaces and properly disperse or place them within the matrix. Whisker fibers (carbides, oxides, metals, etc.), reinforcing fillers (clay platelets, wollastonite, etc.) and similar concepts such as nanomaterial technology have been proposed and have met with limited success in improving reinforced plastics, but the high surface area of these materials requires special techniques to incorporate in the binders at even marginally high volume levels.

The field of reinforced cement has seen significant growth. The substitution of asbestos fiber with glass, cellulose, metal and polymer filaments in reinforcing cement has been especially pervasive. The technology has followed four distinct trends. First, many U.S. patents (U.S. Pat. Nos. 5,989,335; 5,916,361; 5,705,233; etc.) declare the use of low volume levels of well dispersed fine filaments to be effective. None of these, however, can provide true reinforcing value. While the fibers may improve toughness, impact strength and the like, insufficient fiber levels are present to effect any improvement in initial cracking strength . . . making such composites unsuitable for any structural type applications. Second, many of the reinforcements are used in the form of fine filaments but are incorporated at high volume levels with specialized equipment or processing techniques. High pressure, intensive molding, extrusion, laminating, vacuum filtration, etc. have been used to overcome the natural tendency of long, fine fibers to resist consolidation. These fibers also tend to tangle and clump together, making product manufacture difficult. Various disclosures (U.S. Pat. Nos. 6,528,151; 5,733,671; 5,676,105; 5,108,679; et al) detail some of these various processing techniques using fine diameter filaments.

Thirdly, efforts to fabricate, bond or intertwine the filaments into thicker strands have been disclosed in several patents as a means of providing a more desirable fiber geometry (thicker resultant, effective fiber diameters). As specified, herein, these larger diameters are critical to improved wet-out/coating and dispersion/placement in the matrix material. However, these prior art claims do not accomplish the intended purpose as effectively as the use of discrete fibers of a solid/monolithic type structure. Specifically, the various described bonded fiber agglomerations do not provide identical properties to those fibers of the present invention. The bonded strands can become degraded or separated during mixing and molding operations. Furthermore, the individual filaments within the fiber strands can slip (shear bond failures) or break pre-maturely under stress from load forces on the composite. Also, the steps necessary to create the fiber bundles add cost and variability to their reinforcing properties. U.S. Pat. Nos. 6,423,134; 5,685,902; 4,923,517; etc. all propose the use of adhered fiber bundles or filament agglomerations which suffer from the drawbacks noted immediately above as well as other design flaws (excessive fiber length, low fiber volume loading, poor strength/stiffness, etc. as required per this novel invention).

Finally, a limited number of patents have proposed the use of reinforcements with fiber diameters within the range consistent with the present invention. However, in every case either the level of reinforcement or physical properties of the fibers were inadequate to realize any improvement in initial crack or deformation strength of the composite. U.S. Pat. Nos. 6,503,625; 5,443,918; 4,284,667 and similar ones detail the use of these larger fiber diameters. Most of these reinforcements are proposed to be used at levels of less than 10% volume loading. Typically, the referenced lengths of the reinforcements are too long to achieve higher levels, anyway, with a random three-dimensional dispersion of fibers. For instance, a 0.5 mm diameter, 20 mm long reinforcement (40:1 L:D aspect ratio) is not capable of achieving volume levels much greater than 10-20% unless high pressure or mechanical working is used to bend or crush these miniature rods into a more dense packing arrangement. The present invention also differs from reinforced concrete that uses long or continuous steel wire or rebar for strength enhancement. While this type of concrete employs large diameter reinforcement similar to the requirements of the present invention (1.5 to 15 mm diameter), common practice uses less than 10% steel by volume in typical construction. The novel proposed technology requires the use at least 2040% volume and for aligned, uniaxial reinforcements the total volume levels should preferably reach as much as 70% or more. While a steel reinforced concrete composite incorporating this much reinforcement might not be desirable, other materials (eg., long, 5-15 mm diameter fired clay, ceramic or glass rods), alone or in combination with steel members could provide a composite with a superior combination of strength and cost trade-offs. Calculations show that a cement composite with high levels of large diameter, fired clay rod reinforcement might allow for a 50% reduction in both product weight and costs with comparable strength properties relative to traditional steel reinforced concrete.

BRIEF SUMMARY OF INVENTION

It is an object of the invention to produce a means for producing composite material with higher levels of strength and reinforcement capability as compared to current technology. Accordingly, the invention is a means to produce a composite material with alternative reinforcement elements, which can be used at high volume levels.

It is another object of the invention to provide a means for attaining improved levels of strength in a composite material over the strength of unreinforced matrix or binder material, with as low void content, or empty space, as possible. Accordingly, reinforcement elements are used at volume levels over 20% and preferably over 40% by using closely spaced, cylindrically shaped, reinforcement elements in parallel alignment, allowing for ease of orientation. Alternatively, reinforcement elements in the form of short thick fibers or rods with low length to diameter ratio are dispersed in randomly oriented laminates, castings or moldings.

It is another object of the invention to provide a means creating a composite material with the strength and elongation of the reinforcement element being greater than that of the binder material. Accordingly, the reinforcement element is of a geometric configuration such that a ratio of length to diameter is within the range of 2:1 to 20:1, but preferably 10:1, maximum.

It is another object of the invention to provide a convenient means for producing a strong, reinforced composite material at a low cost. Accordingly, the reinforcement elements can be composed from glass, ceramics, fired clay, carbon, steel, copper, aluminum, metal alloys, polymers or natural organic fibrous materials such as wood, cellulose, or paper pulp, and can be used alone or in combination to achieve the desired cost and level of reinforcement strength.

DETAILED DESCRIPTION OF INVENTION

Typical binder materials used for conventional composite products, such as hydraulic cement, plaster, polymer resins, etc., are appropriate for the present invention. These materials can be formulated, mixed, processed and hardened in the usual manner. The composition of the reinforcing element may be selected from the following materials: glass, ceramics, fired clay, vitrified clay, carbon, steel, copper, aluminum, metal alloys, polymers or natural organic fibrous materials such as wood, cellulose, or paper pulp. In the preferred embodiment the geometry of the reinforcing elements is tailored to provide simple, easy mixing at maximum volume levels with uniform dispersion and most optimal strength benefit. The reinforcement is selected from materials having stress-strain curves displaying higher modulus of elasticity (i.e., steeper slope) and greater elongation than the matrix material. Typically, high strength fiberglass, ceramic or other inorganic fibers, graphite fibers, high strength/high modulus organic materials and metal wire or rod are used effectively to reinforce cement, polymers, etc., but high material costs and manufacture difficulties are usually issues. A balance and trade-off of properties will be needed to achieve the optimal materials selection.

Typical composite designs employ fine reinforcing filaments, either as single fibers or as a bundle of grouped or bonded filaments. The filaments are usually converted to other forms such as fabrics, continuous roving or chopped short, discrete lengths. The short, chopped fibers are often disposed by spraying onto a mold surface, depositing as a dewatered/filtered product or other known processes into thin layers which are laminated together with binder material to form thick sheets or molded parts. Alternatively, the long strands are oriented in continuous, aligned arrays within the matrix to resist the imposed forces or loads. However, rarely are the reinforcements simply mixed directly into the fluid binder phase and cast as sheets or poured into molds. The fibers simply do not adequately wet-out or coat with the binder, and the longer chopped strands become easily entangled, forming lumps or balls that cannot be properly deposited into sheets or other shapes. The best option developed so far to allow direct mixing and molding of chopped fiber reinforced composites employs the use of high shear mixing and high pressure molding or pressing equipment. The fiber and binder mixtures are typically produced as either a dilute liquid dispersion or a dough-like compound. In either case the materials must be further processed under precise and demanding conditions to properly densify and shape the materials into final products. These formulations and manufacturing techniques are well known to those skilled in the art, and the complexity, cost and other difficulties in the fabrication process are also well documented. Numerous inventions have been documented and implemented to improve composite processing while maintaining or improving physical properties and costs. However, none of these techniques has allowed the reinforcements to be easily mixed in the binder and directly cast or molded without specialized equipment or processes. Such composites made from pre-mixed formulations often suffer from low reinforcement levels, degraded fiber strength, poor fiber dispersion/uniformity, inadequate fiber bonding to the matrix, high void content and other such problems. While aligned continuous filaments or thin fiber mats can provide high reinforcement levels (>20%), the processing steps are very complex and not readily adaptable to different configurations. The use of short, chopped fibers can also provide high reinforcement volume levels (>20%), but only if rolled, laminated, pressed, extruded or otherwise processed with specialized processing equipment. Blends of fine filaments and binder, which can be mixed with simple paddle blades or tumbling action and which can be poured and formed directly in open molds without aggressive consolidation or densification methods, generally cannot exceed 1 or 2% fiber volume levels. Some of the newer processing techniques describe the ability to approach 5 or 10% fiber volume content, but the improvements in composite strength over unreinforced binder matrix are still not very significant.

The key objective of the present invention, then, is to achieve the ability to mix and form composites using simple direct methods while providing high levels of reinforcement and enhanced physical properties. The design of the reinforcement geometry is limited to relatively few options. The diameter and length of the discrete reinforcing members are, basically, the only main variables that can be manipulated. This leads to four different sets of reinforcement: thin/short, thin/long, thick/short and thick/long reinforcing geometric shapes. The reinforcing elements in common usage today are the thin fiber diameters with short to long/continuous lengths and for certain applications (i.e., steel reinforced concrete) large diameter rods of long/continuous length. This leaves a, heretofore, unexplored area of reinforcement configuration comprised of medium fiber diameters with either short fiber lengths, used for random dispersions, or for certain applications long, aligned rods. Unlike existing reinforcements, these short, thicker fibers have the ability to mix and coat well in the unsolidified binders and to achieve high volume loadings. Remarkably, the benefits that accrue to the use of high volumes of short, thick fibers or miniature rods have not been previously identified. The selection of the binder and reinforcing materials is still critical to proper composite design. The strength and modulus of the reinforcement must provide higher strength and stiffness than the matrix. Additionally, the bonding strength, chemical compatibility, costs and similar properties must be adequate for the intended design and application. However, once proper materials are selected, the novel proposed reinforcing technology simply requires the use of higher volumes of these optimally sized fibers.

As examples of material candidates useful in the present invention, bulk glass formulations (conventional sodium borosilicate), fired clay and steel offer the potential for more optimal reinforcing cost efficiencies (i.e., ratio of useable strength to material costs per unit volume or weight). The key to effective use of these reinforcements hinges on the ability to achieve high volume loadings and efficient strength utilization. The present invention is applicable to any conventional binder system, when combined with novel types of reinforcement possessing the required properties. For instance, high strength thermoset resin composites can be produced using larger diameter, short carbon fibers as specified herein, and strong, cost-effective cement products can be constructed with short, coarse fired clay miniature rods.

Once the desired material compositions of both reinforcements and binders are determined, the physical dimensions of the reinforcements must be specified in the second step in the composite design process. While considerable data has been published on various novel reinforcement shapes and sizes, the use of large diameter fibers (i.e., miniature rods) has been largely overlooked. Basically, the optimal diameter for a fibrous reinforcement occurs in a range greater than typical glass, carbon or polymer filaments but below that of steel rebar or other bulk structural members. For instance, typical glass, graphite or polymer filaments routinely used in cement or plastic composites have diameters of 10 to 20 micron and are used as continuous filament bundles or chopped to 5 to 30 mm lengths before either mixing in the binders or being formed into chopped strand mats. These materials simply do not wet out well in cement pastes or polymer resins due to the high surface area and leave voids or become entangled or clumped, if used at higher levels, when mixed. Alternatively, large diameter rods in the 10 to 20 mm range, such as steel rebar, are not as effective in preventing micro-cracking and are much more difficult to bond adequately to achieve full reinforcing potential. Reinforcing elements in the range of 0.05 to 5 mm diameter are proposed to provide a more optimal trade-off between processing ability and reinforcing value.

Reinforcing elements in the range of 0.1 mm in diameter and less than 50 mm in length are proposed, to achieve the length to diameter ratio of 2:1 to 20:1, with the preferred ideal maximum of 10:1.

The final step in the present invention requires the use of high reinforcement volume levels in composite manufacture. This goal can be more readily achieved in a variety of composite designs/types with the fiber diameters specified above. When used in the form of long or continuous, aligned fibers, a cost effective, efficient reinforced composite can be obtained by simple production means. The fibers or rods can be placed directly in the mold and filled with binder materials by simple casting methods. Finer fibers would not allow the mixtures to flow into or around the reinforcement. However, to achieve high strength with randomly oriented, short fiber reinforcements, further refinements of the reinforcements are needed as outlined below.

Specifically, for three dimensionally reinforced composites the present invention requires the use of fiber diameters of at least 0.05 mm (50 microns) up to about 10-20 mm maximum but at length to diameter (L:D) ratios of well less than 100:1. Most conventional chopped strand filament reinforced composites use fiber L:D ratios much greater then 100:1. The minimum length should be adequate to insure good bonding in the matrix material (i.e., minimal pull out of the fibers from the matrix), but not so long as to inhibit achieving good fiber packing (high volume loading). Typical short fibers with an L:D range of 2:1 to 30:1 will allow at least 20% to as much as 80% fiber volume. The use of larger fiber diameters (i.e., 1-2 mm for instance) with comparably short lengths allows complete wet-out or coating with the precursor matrix materials, but minimal clumping when being mixed. Alternatively, typical finer fiber diameters form lumps or dry mixtures that cannot be evenly or thoroughly mixed, poured or molded even at reduced fiber volume (<20%). Samples of larger diameter glass, metal or fired clay fiber reinforced cement and plastics have been show two provide up to 50-70% volume loading and more than 100% stronger materials than plain unreinforced cement or resin. These samples used 0.1 to 0.5 mm diameter, 1-10 mm long glass; 0.1 to 1 mm diameter, 1-20 mm long steel; and 0.5 to 5 mm diameter, 1-20 mm long clay reinforcement. Blending of fiber sizes and types has also shown the ability to improve volume loading to >70% fiber and increases matrix material strength by 2-3 times.

To demonstrate the stipulated design methodology, cement samples with fired clay reinforcements were manufactured and tested for flexural strength and modulus. First, various types of clay materials were made and evaluated for use as potential reinforcing elements. Strength testing of these fired clays showed the potential to improve properties when used in cement composite products. Also, polymer binder composites were tested.

Example 1

To verify the potential reinforcing properties, various 15 cm long, 1 cm diameter clay rods were used to reinforce cement samples that were 15 cm long, 2 cm thick and 4 cm wide. This uniaxial reinforcement achieved up to a 300% flexural strength improvement with reinforcement levels up to 70% by volume. The costs, weight and other properties of these samples, even at the high fiber contents, provide a distinct advantage over plain concrete or even conventional reinforced cement products.

Example 2

Plain cement reinforced with 50% by volume of a blend of fired clay fiber sizes, 0.5 to 2.5 mm diameter and 2 to 15 mm long, provides flexural strength improvements of up to 100% over unreinforced cement. Plain Portland cement control samples (15 cm length, 6 cm width and 3 cm thickness), made with a 0.35 water to cement ratio, rarely exceed 1000 psi flexural strength when tested with center point loading in a standard bending test. The test samples reinforced with the random dispersions of fired clay rods achieve nearly 2000 psi flexural modulus of rupture. Blending various fiber diameters (0.5 to 5 mm) possessing various fiber lengths (1 to 20 mm), yielding L:D ratios in a range from 2:1 to 10:1, can provide further improvements to fiber volume loading as well as product strength. Also, sample coupons made with these same materials were tested in compression (crush strength). The plain cement matrix typically achieves a compressive strength in the range of 5000 to 7000 psi while the reinforced composites display a crush strength of over 10,000 psi. Other properties (impact, stiffness, shear, tension) show similar improvements for these samples reinforced with high volumes of short, coarse fired clay miniature rods.

Example 3

Cement binder reinforced with 50% by volume of 0.5 mm diameter, 5-10 mm long chopped galvanized steel wire showed similar benefits. Although the steel wires tend to debond before breaking, the contribution to load carrying ability results in a flexural strength improvement 2 to 3 times plain cement controls at 50% volume loading levels (i.e., up to 2500 psi for the reinforced composites).

Example 4

The same steel wire segments from Example 3 (0.5 mm×5-10 mm size) were used to reinforce an epoxy resin. At a 40% volume level, the composites were found to show a 50% improved over sample coupons made with plain, unreinforced epoxy resin. Higher volume loading and strength is possible, but requires improved bonding between the metal fibers and the epoxy resin. Various surface treatments and sizing agents known in the field can be used to achieve this result.

Such examples are typical of the range of possibilities pertinent to this invention, based on an improved cost/performance trade-off of the reinforcements. The concept of using moderate diameter fibers in either short random dispersions or long, aligned arrays to achieve higher fiber content and increased strength can be applied to a variety of material types (cement composites, glass reinforced plastics, metal matrices, etc.). The applications include building materials, paving products, engineering structures and other areas where improved manufacture, low cost and enhanced physical properties are required.

In summary the keys to making improved composite materials according to the present invention involve the specification and selection of materials with a specific range of properties, and the use of unique physical/dimensional forms for the reinforcements made with these materials. Combining these two features within a single system has not been effectively accomplished in the prior art. These novel composite systems also derive benefit from the ability to use simplified manufacturing methods for incorporating said reinforcements into the binder matrix. In the first step the materials used in the composite must be chosen so that the strength and stiffness (Modulus of Elasticity) of the reinforcing materials meet or exceed the binder's strength and stiffness properties. As a further refinement, the ratio of the yield stress point (i.e., maximum usable strength limit) to the material's Modulus of Elasticity (stiffness) must be approximately the same for both binder and fiber. This requirement insures that the strain or elongation to failure of the reinforcements is roughly the same as binder's ultimate strain limit. Any major differences in strain properties translates into poor reinforcing efficiencies and/or premature failures. Once these varied objectives are met, both materials (fibers and binders) must then be evaluated for proper interfacial bonding, adequate corrosion resistance, costs, density, etc. Next, for these component materials to be used effectively in a composite system, high levels of reinforcement are required according to this invention. Coating or wet-out of fine filaments is difficult and limits the volumes that can be incorporated. Using very large diameter rods results in poorer reinforcement placement per unit volume (i.e., large gaps in the spacing between the reinforcing elements) and allows for premature generation of matrix cracks. Therefore, reinforcing elements with diameters in the range of 0.05 mm to 10-20 mm are specified, herein. These fiber/rod sizes can then be directly incorporated into the matrix as short, randomly oriented fibers or through a further embodiment of the present invention in compacted, aligned arrays of long fibers. By using thick, short fibers (i.e., with small length to diameter ratios, <20:1 L:D or preferably, <10:1 L:D) the reinforcements can be easily mixed and cast or molded into complex parts with one, two or three principle dimensions. In any case fiber volumes of 50-70% are easily achieved.

The specific method used in the present invention to achieve high volume loading is to provide the composite material as a paste, thick slurry or highly filled fluid of limited excess liquid volume compared to the volume content between the loosely deposited or loosely consolidated reinforcements prior to curing, drying or otherwise solidifying the binder matrix. Specifically, the composite paste or fluid mixture has less than 10% excess liquid as measured by the amount of liquid required to fill the volume between the solids, and the liquid is only separable from the paste with the application of mechanical pressure or other external forces. The composite paste or fluid mixture contains the reinforcements disposed in a random three dimensional orientation and in a uniform, fully dispersed array. Preferably, the paste mixture is created using low speed, low shear agitation or blending. This particular mixing mechanism imparts a velocity and shear force to any one reinforcing element that is essentially the same or less than those values that would be imparted by the force of gravity alone in conventional low speed, low shear mixers that fold or tumble the materials together. This mixing mechanism acts on a reinforcing element in a rotating barrel, horizontal cylinder or tumbler type and not as a pressurized container. Preferably, the gap between adjacent parts of the mixing apparatus, where one or both parts are moving at different velocity relative to each other, is no less than the maximum dimension of any singular reinforcing element and preferably, at least ten times greater than the maximum dimension of any singular reinforcing element. The material is then poured or distributed using gravity, shaking, vibration, trowelling or other low pressure, low shear, low compaction mechanical means into molded shapes without the need for high pressure rolling, pressing or laminating techniques or the need for high compression closed mold processing.

Once the random three dimensional mixture of fibers is formed into the paste or slurry it may be poured into a one, two or three dimensional reinforcement orientation. A three dimensional reinforcement orientation is achieved by pouring the paste in random arrays en masse into a large bulk mold such that fiber length is smaller than any one dimension of the mold. A two dimensional flat sheet reinforcement orientation is achieved by pouring the paste in planar arrays into one or more thin layers which define said mold, by pouring one layer at a time such that fiber length is equal or greater than each layers thickness. A one dimensional reinforcement orientation is achieved by pouring the paste in aligned arrays into the mold having at least one long narrow dimension, by pouring one or more thin beads or strips of paste one at a time into the mold such that fiber length is equal or great that the cross-sectional dimensions of each said strip.

What we claim as our invention is:

1. A composite material which includes a hydraulic cement and a plurality of reinforcing ceramic fibers in which said reinforcing ceramic fibers comprise a plurality of fiber particles having a diameter or thickness in the range of 0.05 mm to 20 mm, and a length of less than 50 mm and which are present in said composite material at a volume greater than 20% of its total volume, wherein said reinforcing ceramic fibers are short, discrete fibers having a length to diameter dimensional ratio with a minimum value of 2:1 and a maximum value of 20:1, and used in a random one, two or three dimensional orientation within said composite material.

2. A composite material which includes a hydraulic cement and a plurality of reinforcing fibers in which said reinforcing fibers are oriented in arrays which are planar two dimensional or unidirectional and parallel to each other in alignment having a diameter or thickness in the range of 0.05 mm to 20 mm, and a length of less than 50 mm and which are present in said composite material at a volume greater than 40% of its total volume, wherein said reinforcing fibers are short, discrete fibers having a length to diameter dimensional ratio with a minimum value of 2:1 and a maximum value of 20:1, wherein said reinforcing fibers are first mixed into the hydraulic cement in random three dimensional uniform dispersion and then said reinforcing fibers are deposited in one or two dimensional orientations within said composite material, wherein said reinforcing fibers are selected from a group consisting of materials consisting of fired clay, ceramics, and carbon.

3. The composite material of claim 2, wherein the reinforcing fibers are unidirectional in alignment and exceed 60% by volume.

4. The composite material of claim 2, where the hydraulic cement is selected from the group consisting of gypsum, plaster, or Portland cement.

5. The composite material of claim 2, where the reinforcing fibers are selected from the group consisting of ceramics, steel, copper, aluminum, polymers, organic, natural material, cellulose, or paper pulp.

6. The composite material of claim 2 which, prior to curing, drying or otherwise solidifying the hydraulic cement, is a composite paste or fluid mixture with less than 10% excess liquid, wherein said liquid is not separable from said composite paste or fluid mixture without mechanical pressure or external forces, wherein said composite paste or fluid mixture contains said reinforcing fibers disposed therein in a random three dimensional orientation and in a uniformly dispersed array, wherein said composite paste or fluid mixing prevents degradation of the fiber strength and reinforcing capabilities.

7. The composite material of claim 1, combined with steel wire/rebar and large diameter rods greater than 1.5 mm in diameter and greater than 50 mm in length or greater than 20:1 length to diameter ratio, or with other reinforcing fibers with fiber diameters or particle thickness less than 0.05 mm and greater than 20:1 length to diameter ratio or less than 2:1 length to diameter ratio in amounts of 0.1% volume or more selected from the group consisting of carbon filaments, metal or inorganic fibers, polymer fibers or wood pulp fibers.

8. A composite material having reinforcing fibers, made using hydraulic cement by open cavity mixing and molding, and reinforced with greater than 20% by volume non-porous, vitrified clay reinforcing fibers at least one selected from the group consisting of reinforcing fibers with dimensions consisting of, 0.25 mm to 0.5 mm diameter and 1 mm to 5 mm length, 0.75 mm to 1.25 mm diameter and 2.5 mm to 15 mm length, 1.5 mm to 4 mm diameter and 8 mm to 30 mm length, 5 mm to 15 mm diameter and 30 mm to 45 mm length, and with said reinforcing fibers are deployed in a one, two or three dimensional orientation.

9. The composite material of claim 1, wherein the reinforcing fibers exceed 40% by volume.

10. The composite material of claim 1, where the hydraulic cement is selected from the group consisting of gypsum, plaster, or Portland cement.

11. The composite material of claim 1 which, prior to curing, drying or otherwise solidifying the hydraulic cement, wherein said material is a composite paste or fluid mixture with less than 10% excess liquid, wherein said liquid is not separable from said composite paste or fluid mixture without mechanical pressure or external forces, wherein said composite paste or fluid mixture contains said reinforcing fibers disposed therein in a random three dimensional orientation and in a uniformly dispersed array, wherein said composite paste or fluid mixing prevents degradation of the fiber strength and reinforcing capabilities.

12. The composite material of claim 1, wherein said reinforcing fibers are vitrified clay.

13. A composite material which includes a hydraulic cement and a plurality of reinforcing fibers, wherein said reinforcing fibers comprise a plurality of fiber particles having a diameter or thickness in the range of 0.05 mm to 20 mm, and a length of less than 50 mm and which are present in said composite material at a volume greater than 20% of its total volume, wherein said reinforcing fibers are short, discrete fibers having a length to diameter dimensional ratio with a minimum value of 2:1 and a maximum value of 20:1, and used in a random one, two or three dimensional orientation within said composite material;

wherein said reinforcing fibers are selected from the group consisting of steel, copper, aluminum, polymers, organic, natural material, cellulose, or paper pulp, wherein tensile modulus, elongation and strength properties of said reinforcing fibers exceed tensile modulus, elongation and strength properties of the hydraulic cement; and wherein said hydraulic cement is selected from the group consisting of gypsum, plaster, or Portland cement.

14. The composite material of claim 13, combined with wire, bars, or large diameter rods greater than 1.5 mm in diameter and greater than 50 mm in length or greater than 20:1 length to diameter ratio, or with other reinforcing fibers with fiber diameters or particle thickness less than 0.05 mm and greater than 20:1 length to diameter ratio or less than 2:1 length to diameter ratio in amounts of 0.1% volume or more.

* * * * *